United States Patent [19]

Yelke

[11] 4,185,494

[45] Jan. 29, 1980

[54] DIAGNOSTIC SYSTEM FOR FUEL INJECTED ENGINES

[75] Inventor: Edward Yelke, LaGrange, Ill.

[73] Assignee: Creative Tool Company, Lyons, Ill.

[21] Appl. No.: 913,826

[22] Filed: Jun. 8, 1978

[51] Int. Cl.[2] .......... G01M 15/00

[52] U.S. Cl. .......... 73/119 A; 73/753

[58] Field of Search .......... 73/119 A, 117.3, 753, 73/115; 324/16 T; 310/338

[56] References Cited

U.S. PATENT DOCUMENTS

| | | | |
|---|---|---|---|
| 3,503,255 | 3/1970 | Germann et al. | 73/119 A |
| 3,511,088 | 5/1970 | Weaver | 73/119 A |
| 3,541,847 | 11/1970 | Pisors | 73/119 A |
| 3,573,609 | 2/1970 | Vaher | 324/16 T |
| 3,942,366 | 3/1976 | Hofmann | 73/119 A |
| 4,046,004 | 9/1977 | Iwasaki et al. | 73/119 A |
| 4,052,663 | 10/1977 | Lindsey | 73/119 A X |

OTHER PUBLICATIONS

Diesel Diagnosis with Monoflash Diesel Tester, Sales Brochure by Degamo, Inc. Chicago, Ill.

*Primary Examiner*—Jerry W. Myracle

*Attorney, Agent, or Firm*—Neuman, Williams, Anderson & Olson

[57] ABSTRACT

An electronic timing system for fuel-injected engines is disclosed in which a direct readout is provided for measuring the time relationship between fuel injection and the achievement of the top dead center (TDC) condition in a preselected cylinder of a diesel engine. A piezoelectric transducer coupled to the fuel-injection system provides a pulse upon the injection of fuel into a feed line for the selected cylinder. This pulse is detected in a noise blocking, variable threshold, amplifying circuit and initiates a timing pulse, the width of which constitutes a delay period after which a strobe light is activated for observation of timing marks on the engine. By adjusting the timing pulse width or delay of the strobe light such that illumination occurs at the time the piston reaches top dead center within the cylinder, as indicated by the timing marks on the dynamic damper, the width of the delay or timing pulse can be taken as representative of timing advance. Suitable apparatus is provided for reading the width of the timing or advance pulse in an analog or digital manner. Conversely, the desired advance angle may be set manually and the proper timing can be established by adjusting the advance angle until the strobe light coincides with the occurrence of piston top dead center within the cylinder. An alternate mode of system operation provides a readout of engine speed on the same meter used for timing readout. Appropriate switching and calibrating circuitry is included for this mode as well. Both the apparatus and method for the aforesaid timing system are disclosed, together with a plurality of transducers suitable for use with the system.

11 Claims, 5 Drawing Figures

DIAGNOSTIC SYSTEM FOR FUEL INJECTED ENGINES

FIELD OF THE INVENTION

This invention is related to timing systems and components thereof for internal combustion engines and, in particular, to systems for timing the advance of the fuel injection in a fuel-injection type engine.

BACKGROUND OF THE INVENTION

The continuing need for energy conservation has produced renewed interest in the diesel engine as an alternative to the spark-fired piston engine. In addition, it has created a need for greater fuel economy in such engines and an attendant need for improved timing apparatus and diagnostic equipment which is both inexpensive and easy to use. Conventional timing apparatus employs the use of timing marks on a flywheel located at the bottom of the engine. Due to the location of the engine flywheel, however, it has been difficult in many instances to read the actual ignition advance from the flywheel or provide any degree of resolution for readings between calibrated markings on the flywheel. In diesel engines graduated flywheel markings are not provided by many manufacturers due to the lack of any convenient way to detect the time of fuel injection, the time of cylinder firing or other parameters or events occurring during the combustion cycle of a given diesel cylinder.

With the advent of suitable transducers for detecting fuel injection or firing in a given cylinder, the need for and desirability of adequate timing apparatus has been further enhanced. Fuel injection and cylinder transducers of the type described are disclosed in the U.S. Pat. No. 4,036,050 of Dooley and Yelke dated July 19, 1977 and in the copending application of Dooley and Yelke Ser. No. 796,008 now U.S. Pat. No. 4,109,518. However, available fuel line transducers produce output signals which, in addition to the primary output pulses created at the initiation of injection, include ringing and spurious variations resulting from secondary effects of the fuel surge and engine vibrations.

SUMMARY OF THE INVENTION

The apparatus of the present invention is particularly adapted to provide timing information from signals derived during the combustion process of a diesel engine. More specifically, the apparatus in the present invention is designed to accept the signals and attendant noise obtained from pressure-line transducers operating during the running time of the diesel engine. It is a specific object to provide timing apparatus incorporating noise eliminating circuitry which effectively filters or disregards signals emanating from spurious variations in fuel-line pressure or from engine vibrations.

It is another object of the present invention to provide timing apparatus which provides a direct readout from external equipment with a minimum of observation of the difficult-to-read marks on flywheels or timing gear on the engine.

It is still a further object to provide timing apparatus for diesel engines which is at the same time inexpensive and easy to operate.

Other objects and advantages of the present invention will become apparent upon reading the detailed specifications set forth below together with the appended claims and with reference to the associated drawings.

While the invention will be described in connection with certain preferred embodiments, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENTS

Figure 1:
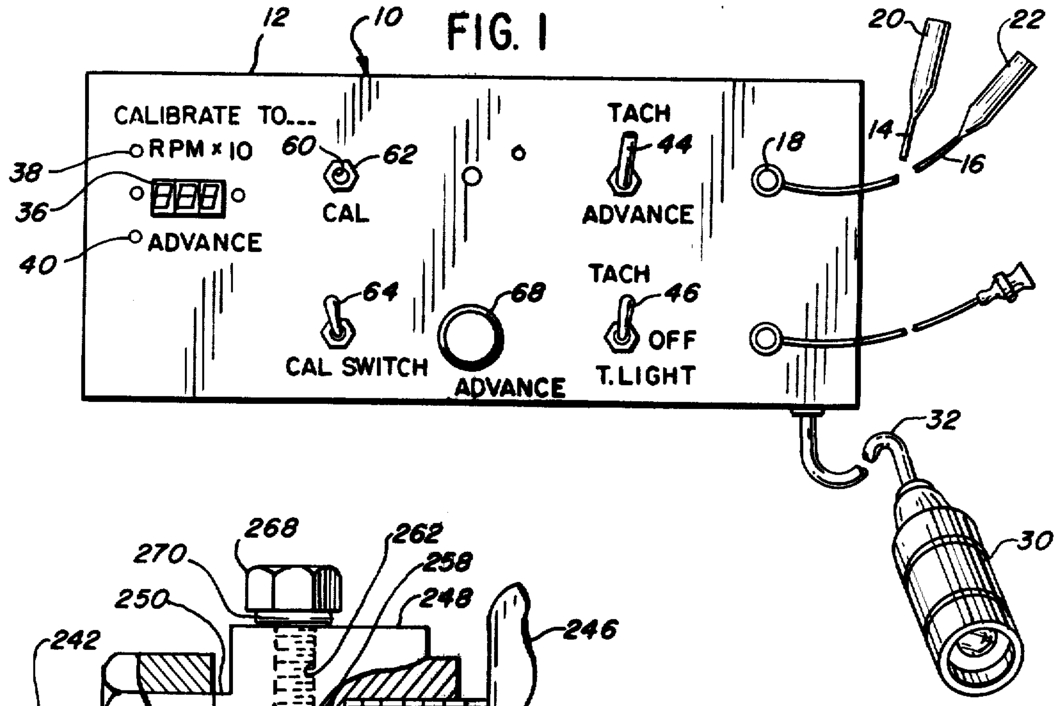
FIG. 1 is a view of the control and readout panel for use in the preferred embodiment of the present invention.

Turning first to FIG. 1, there is shown a housing 10 for holding the principal electronic components and controls used in the present invention. The housing is shown in simple box form, but it is contemplated that the housing 10 may be included as an integral component in a travel case which includes other fittings and transducers to be described below. The housing 10 has a faceplate 12 on which are mounted principal readout and control devices used in the timing system.

For the purpose of providing power to the system, there is provided a pair of leads 14, 16 projecting from an aperture 18 in the faceplate 12 and having a pair of connectors 20, 22, respectively, at the ends thereof. The connectors 20, 22 will preferably be of the alligator-clip type for quick connection to the terminals of the vehicle battery or other suitable 12 or 24-volt source (not shown). Projecting from a second aperture 24 of the faceplate 12 is another cord 26, typically of the coaxial type, having an electrical connector 28 at its outer end which is for connection to a fuel pressure transducer to be shown and described below in connection with FIGS. 3, 3*a*, and 4.

For the purpose of providing a light source for observing the timing marks on the engine to be analyzed, the system includes a strobe light 30 which is energized from the components within the housing 10 through an electrical supply cord 32 emanating from the bottom of the housing 10.

The components described thus far are not unlike those associated with conventional engine timing apparatus with the exception that the timing signal to be derived from the engine through the connector 28 is to be representative of fuel injection into a given engine cylinder as opposed to other engine parameters that might be monitored.

In accordance with the present invention, means are provided for selectively manifesting both engine r.p.m. and timing advance through a common readout. The choice between these two functions is facilitated through the provision of suitable switching devices and controls for calibrating the unit as desired. To this end, the faceplate 12 of the control panel includes a three-digit display 36 which serves the dual purposes of indicating engine speed (in r.p.m. divided by ten) and timing advance (in degrees of engine rotation). An indicator light 38 situated immediately above the display 36 is illuminated whenever the system is being used as a tachometer, while a second indicator light 40 is illuminated whenever the system is used to measure timing advance. The choice of readout on display 36 is made via a two-position toggle switch 44, the upper position of which is used during tachometer readout, while the lower position is used during readout of timing advance.

For the purpose of controlling the selective application of power to the system, there is provided a three-position toggle switch 46 having positions labeled TACH, OFF, and T. LIGHT. Although the circuit connections associated with this switch which will be described below, it is here noted that when the switch 46 is in the OFF position, all power to the unit is disconnected as indicated by a darkened condition in a power indicator light 48 located at the upper center of the faceplate 12. With the switch 46 in the TACH position, power is applied to the system but no energy is provided to the timing light 30. As such, the system can be used as a tachometer only, and only if the display control switch 44 is also in the TACH position. When the switch is in its lower or T. LIGHT position, power is made available for the timing light 30, and the system may be used in display either engine speed or timing advance depending upon whether the display control switch 44 is in its upper (TACH) or lower (ADVANCE) position. Manufacturer's specifications typically set forth the appropriate timing for various speeds. Accordingly, it is important that an accurate measure of engine speed be available at all times. To this end, the present system includes means for accurately calibrating the tachometer function in the form of a potentiometer (not shown) having an adjustment screw 16 secured to the faceplate 12 of the housing 10 by a locknut 62. Operating in conjunction with the screw 60 is a spring-loaded switch 64 immediately therebelow. At any time during a test, the TACH function of the system can be calibrated by holding the spring-loaded momentary switch 64 down until the number to which the system is calibrated (as indicated in the upper lefthand corner of the faceplate 12) appears on the digital display 36. If the proper number does not appear, the locknut 62 is loosened and the screw driver adjustment 60 is turned until the required number appears on the display 36, after which the locknut 62 is secured and calibration is complete.

The scheme of timing contemplated for the system of this invention requires that the timing light 30 be fired at the occurrence of top dead center (TDC) position of the number one (or other) piston within its cylinder, as indicated by the observation of a top dead center (TDC) mark on the dynamic damper, or flywheel, of the engine through the strobe effect in a manner similar to that used with conventional timing light systems. Since fuel is necessarily injected into the line to the cylinder of interest at a predetermined time in advance of the achievement of top dead center position by the piston, adjustable means are provided for delaying the firing of the strobe light 30 by a predetermined time period initiated by the occurrence of injection into the fuel line. For controlling this time delay in triggering the strobe, there is provided a manually variable advance control knob 68 mounted on the faceplate 12 of the timing unit. The function and construction of the advance control knob 68 will be described below in detail. However, it is noted that in normal operation, the advance control 68 is adjusted to increase or decrease the delay between fuel injection into the line and the firing of the strobe light 30 such that the latter event will occur at the achievement of top dead center by the piston within the cylinder. The time delay resulting from adjustment of the advance knob 68 is internally measured in the circuitry to be described and is displayed as degrees of injection advance on the display unit 36.

Figure 3:
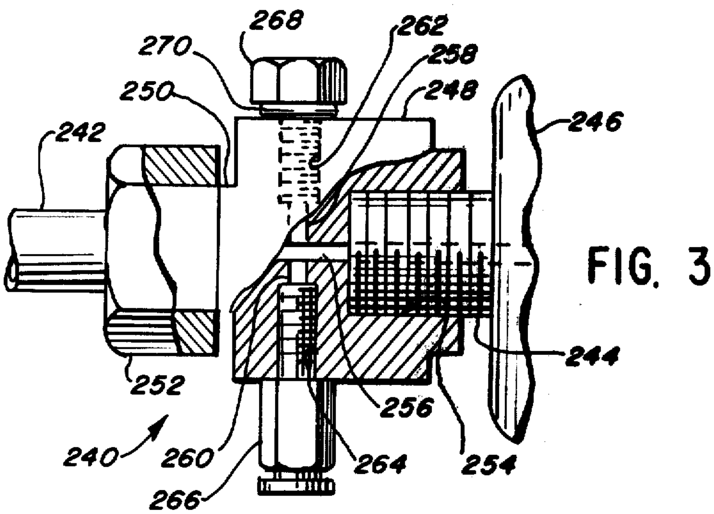
FIG. 3 is a perspective view, partially cut away, of a transducer and adapter body mounted at the end of a fuel-injection line.
Figure 3A:
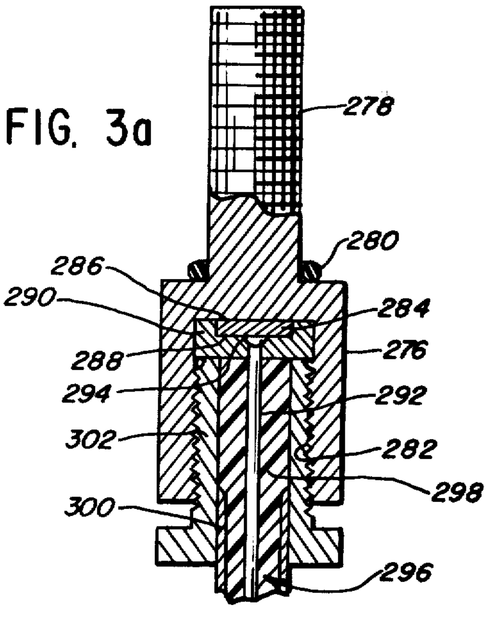
FIG. 3*a* is a cut-away view of a cap-screw type transducer for use with the adapter body of FIG. 3.
Figure 4:
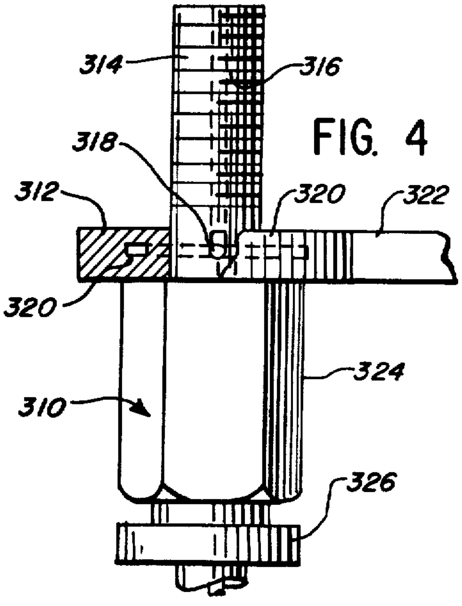
FIG. 4 is a cut-away view an alternate transducer for use with a particular type of fuel injection fitting.

The engine for which the diagnostic system of the present invention is best suited is typically one having an injection pump and a plurality of fuel-injection lines, each running to a respective cylinder of the engine from the pump. Fuel is injected into the lines by the pump in a sequential manner. It is contemplated that the apparatus of the present invention can be used in at least two principal modes. In a first mode it is used in conjunction with a nozzle transducer such as the type disclosed in FIGS. 2, 6, 6*a*, 6*b*, and 7 of U.S. Pat. No. 4,036,050 of the applicant and Joseph Dooley, entitled ENGINE MONITORING APPARATUS. Used in this manner the system can accurately measure timing between the ignition of the fuel within the cylinder and the achievement of the cylinder top dead center condition. In a second available mode, and the mode described herein, the system is used to measure the relationship between the arrival of a fuel surge at a preselected end of the fuel line (i.e. the pump end or injector nozzle end) and the achievement of the top dead center condition of the piston within the cylinder. In the latter mode the timing input signal to the connector 28 is derived from a fuel-line transducer located at the injection pump or at the injector nozzle for the selected cylinder. Transducers of this type are shown herein, as well as in the aforesaid U.S. Pat. No. 4,036,050 (in FIGS. 8, 8*a*, and 8*b*). While they will be described in greater detail below, it is noted that the transducers disclosed in the present application in FIGS. 3, 3*a*, and 4 are adaptable to the measurement of timing from either the injection pump or the nozzle, depending upon the characteristics of the fuel-system fittings. The transducer depicted in FIG. 3, for example, may be inserted into the line at either of its ends with equal effectiveness without interrupting the flow of fuel through the line by mechanical means or otherwise. Similarly, the transducer shown in FIG. 4 and described below, may be used in any system incorporating banjo-type fittings at either the injection pump or nozzle. To achieve uniformity in readings from engine to engine, it is usually more desirable to monitor the timing of fuel flow at or near the injection nozzle which is mounted to the engine, since the fuel travel time through fuel lines of varying length is not a constant and can cause inaccuracies if not properly compensated for.

Figure 2:
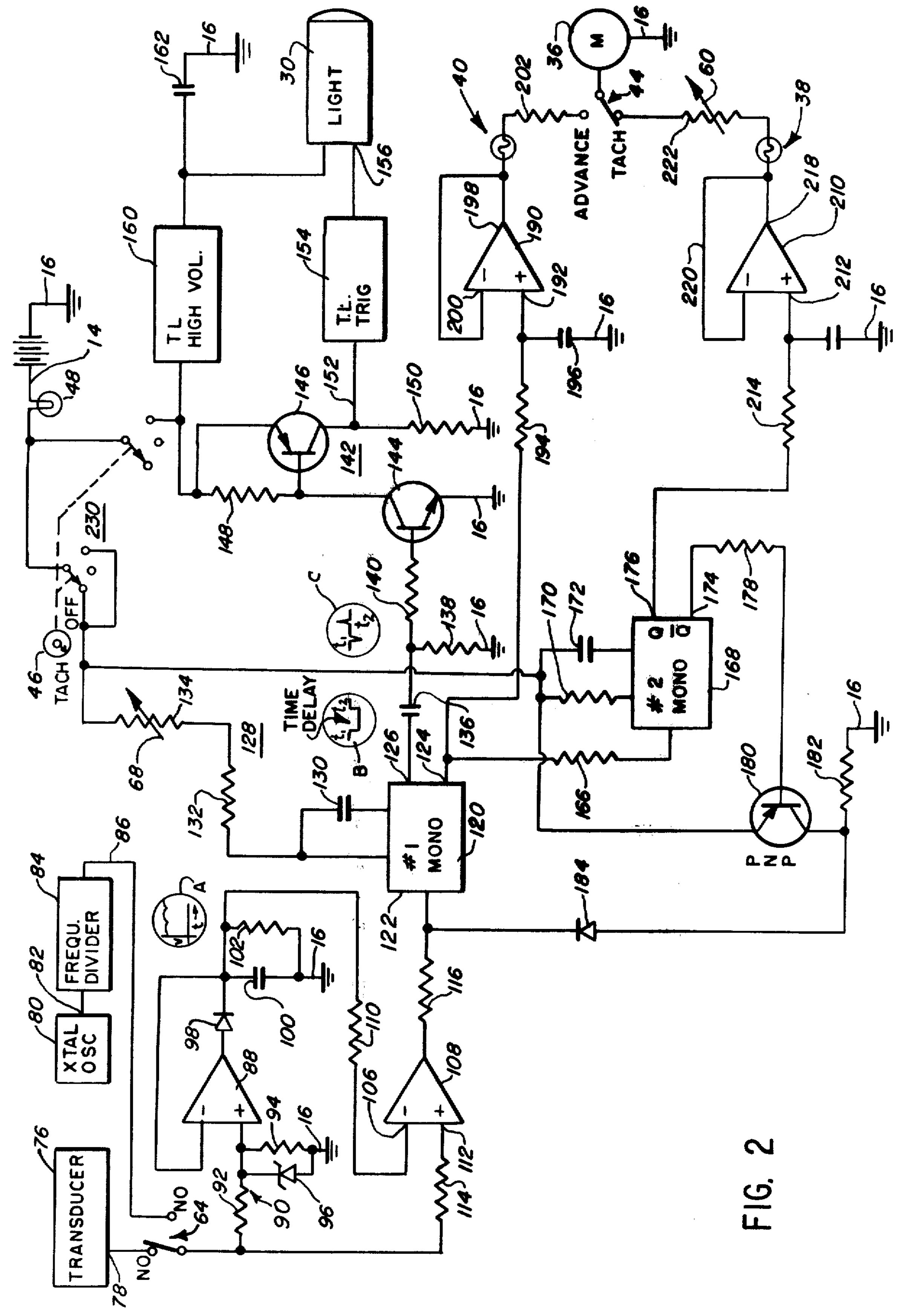
FIG. 2 is a schematic circuit diagram, partially in block form, for use in the preferred embodiment of the present invention.

The circuitry used for the preferred embodiment of the invention is set forth in FIG. 2, wherein components common to the control panel shown in FIG. 1 are designated by the same reference numerals used in FIG. 1. For developing a signal upon the occurrence of fuel injection into the line, there is provided a transducer 76 having an output 78. The signal developed at the transducer output 78 is selectively coupled through the normally-closed (NC) contacts of the spring-loaded momentary toggle switch 64 designated CAL. SWITCH on the front panel (FIG. 1).

The other input of the CAL. SWITCH 64 is derived from a reference crystal oscillator 80 which produces a constant high-frequency reference signal at an output 82. This signal, in turn, is divided in frequency by a divider circuit 84 to produce a stable frequency reference signal on a line 86, which is coupled to the normally-open (NO) pole of the CAL. SWITCH 64.

As noted previously, the output signals from conventional fuel line and nozzle transducers, in addition to containing the primary pulses representative of the initiation of injection, may contain secondary variations such as transient spikes due to various engine vibrations and "ringing" of the primary signal.

In order to enhance the immunity of the circuit to the secondary signal characteristics therefore, there is provided a threshold-detecting amplifier means adapted to respond to the transducer output signal only if its magnitude exceeds a predetermined scaled percentage of the principal output signal from the transducer 76. To this end, the circuit shown in FIG. 2 includes a first operational amplifier 88 for developing a threshold-setting DC level shown in the circular signal diagram A to the right of the amplifier 88. The non-inverting input of the amplifier 88 receives the signal from the transducer 76 through a voltage-dividing network 90 consisting of a series resistor 92 and a shunt resistor 94 having a zener diode 96 in parallel therewith. The zener diode 96 provides a positive clamp at the non-inverting input of the amplifier 88 in the event that the transducer output signal exceeds in predetermined maximum value.

The output of the amplifier 88 is coupled through a diode 98 to an integrating network consisting of a capacitor 100 in parallel with a resistor 102 running to the ground bus 16. The output from the integrating network is direct coupled back to the inverting input of the amplifier 88 for feedback purposes. The time constant of the RC network 100, 102 is established such that the output signal from the amplifier 88 assumes a generally constant d.c. level shortly after operation of the system begins.

That d.c. level is coupled to the inverting input 106 of a second operational amplifier 108 through a resistor 110. The amplifier 108 has a non-inverting input 112 which receives the output signal from the transducer 76 through a series resistor 114. Coupled to the output of the amplifier 108 is another series resistor 116.

During normal operation of the circuitry described thus far, the principal output signal from the transducer 76, resulting from injection of fuel into the line, will pass through the amplifier 108 since it will normally be of an amplitude which is greater than that of the threshold-setting signal at the inverting input 106 of the amplifier 108. Lesser magnitude signals from ringing or transient noise, which might be produced by the tranducer 76, typically fall below the level of the threshold signal at the inverting input 106 of the amplifier 108 and are effectively blocked from passage through the amplifier 108.

In accordance with another aspect of the present invention means are provided for generating a timing pulse in response to each of the primary transducer output signals passed by the amplifier 108. Furthermore, this timing pulse is manually variable in nature to allow for accurate alignment of the timing marks on the engine in a manner described previously and below. The accomplish this function the circuitry of FIG. 2 includes a first monostable multivibrator 120 having an input terminal 122 which is triggered by the transducer output signal passed by the amplifier 108 through the series resistor 116. The positive-going output signal of the multivibrator 120 is provided at a terminal 124 while the negative-going output of the multivibrator is provided at a terminal 126. The pulse width of the output signal from the multivibrator 120 is determined by a RC timing network 128, which is shown, for illustrative purposes, as including a capacitor 130, a fixed resistor 132, and a variable resistor 134 selectively connector to the power supply and controlled by the ADVANCE knob 68 on the system faceplate 12. The arrangement of components and connections for the RC timing network 128 may vary depending upon the selection of component for the monostable circuit 120.

In order to develop a signal to trigger the timing light 30 at the conclusion of the delay pulse created by the multivibrator 120, there is provided at the output 126 of the circuit 120 a differentiating network consisting of a series capacitor 136 and a shunt resistor 138 running to the ground bus designated by the numeral 16. The output of the differentiating network is coupled through a series coupling resistor 140 to an amplifying circuit 142 consisting of a first transistor 144 and a second transistor 146 of the NPN and PNP variety respectively. The emitter of the first transistor 144 is coupled to the ground bus 16, while the collector of this transistor is direct coupled to the base of the second transistor 146, while being selectively coupled to the positive power supply through a biasing resistor 148. Since the NPN transistor 144 operates in a grounded emitter configuration, only the positive-going spike, developed by the aforesaid differentiating network, is amplified by the amplifying circuit 142.

The second transistor 146 of the amplifier 142 has its emitter selectively coupled to the positive supply while its collector is coupled to ground through a load-resistor 150 and provides an output on a line 152 to a conventional timing light trigger circuit 154. The output of the trigger circuit 154 is directly coupled to the timing light 32 via an input terminal 156 thereto. The timing light 32 is preferably a xenon tube requiring a high-voltage supply, typically in the range of 600 volts.

The high-voltage supply circuit is represented in FIG. 2 by a functional block 160 which may contain any of a plurality of step-up voltage circuits known in the art. A capacitor 162, coupled between the output of the voltage-converting circuit 160 and the ground bus 16, stores the charge to be used when the timing light 32 is fired. The low voltage input to the circuit 160 is selectively supplied from the d.c. power supply via the front panel switch 46 in a manner to be described below.

The circuitry as described thus far operates to trigger the light 32 at a predetermined time interval subsequent to the generation of a signal by the transducer 76, that time interval being determined by the variable resistance 134 under the control of the manual ADVANCE knob 168 on the faceplate 12 (FIG. 1).

In order to insure that spurious firing of the monostable multivibrator 120 does not occur as a result of ringing that may accompany the primary output signal from the transducer 76, means are provided to clamp the input of the multivibrator 120 for a predetermined time subsequent to the occurrence of the primary output signal from the transducer 76 and thereby inhibit operation of the multivibrator 120 for a preselected period of time sufficient to allow the ringing to decay to a safe level. For accomplishing this objective, the positive-going output signal from the multivibrator 124 is coupled through a series resistor 166 to the trigger input of a second monostable multivibrator circuit 168. The output pulse width produced by the multivibrator 168 is preselected to be of an appropriate fixed duration, 20 milliseconds, for example, through a conventional RC timing circuit represented by a fixed resistor 170 and a capacitor 172 coupled between the multivibrator 168 and the switched positive supply. This network, like the timing network 128 for the first multivibrator circuit 120, may vary in configuration and component value depending upon the choice of component type and manufacturer for the multivibrator circuit 120.

Negative-going and positive-going output signals are provided from the multivibrator circuit 168 on output terminals 174 and 176 respectively. The negative-going output signal from the multivibrator circuit 168 is coupled through a series resistor 178 to the base of a PNP transistor 180 which acts as a disabling clamp for the input 122 of the first multivibrator circuit 120. Transistor 180 has its emitter coupled to the switched positive supply, while its collector is coupled to ground through a load-resistor 182. A diode 184 connects the collector of the transistor 180 to the input of the multivibrator 120.

It will be appreciated, therefore, that an initial signal to the input 122 of the multivibrator circuit 120 from the transducer 76 initiates a positive-going output pulse at the output terminal 124 which immediately triggers the multivibrator circuit 168 into operation. The negative-going output signal initiated at the output terminal 174 instantaneously biases the transistor 180 into conduction and holds it into conduction for the duration of the time constant of the multivibrator circuit 168. During this period of conduction of the transistor 180, the input 122 of the multivibrator 120 is biased to a high voltage which effectively blocks further triggering by signals emanating from the amplifier 108.

In accordance with another aspect of the present invention, means are provided for manifesting the duration of the timing pulse generated by the multivibrator circuit 120 in a manner which is representative of degrees of engine crank shaft rotation at any chosen speed.

To this end, there is provided an integrating operational amplifier circuit, including an amplifier 190 having an inverting input 192 coupled to the positive-going output 124 of the multivibrator circuit 120 through an RC network consisting of a series resistor 194 and an integrating shunt capacitor 196 running to the ground bus 16. The output terminal 198 of the amplifier 190 is direct coupled back to the inverting input 200 of the amplifier 190 to form a feedback loop. As timing pulses from the transducer 76 consecutively trigger the multivibrator circuit 120 into operation, the output pulses therefrom are effectively integrated to create a d.c. signal level at the output terminal 198 of the amplifier 190, which is proportional to the time delay for the strobe light 32 created by the manually variable output pulse width of the multivibrator circuit 120. In order to convert this d.c. signal level to a usable digital readout, the output of the amplifier 190 is coupled through a series resistor 202 to one terminal of the TACH-ADVANCE selector switch 44 shown on the face plate 12 of the housing 10 in FIG. 1. When the switch 44 is in the ADVANCE position, the output of the amplifier 190 is coupled to the meter and display circuitry indicated generally at 36 in FIG. 2. Internal to the display circuitry 36 are suitable circuits for converting the d.c. input level to a three-digit decimal output indicative of the timing advance. A suitable choice for the display circuit 36 is a device designated LD130 manufactured by Siliconix Inc.

Further in accordance with the present invention, means are provided for allowing portions of the timing-measurement circuitry thus far described to be utilized in providing an indication of engine speed. To accomplish this goal the circuit of FIG. 2 includes an integrating tachometer circuit consisting of an operational amplifier 210 having its non-inverting input 212 coupled to the positive-going output of the monostable multivibrator 168 through an RC network consisting of a series resistor 214 and an integrating capacitor 216 connected to the ground bus 16. The output signal from the amplifier 210 is produced at a terminal 218 which is direct coupled back to the inverting input of the amplifier 210 via a feedback line 220. The signal from the output 218 of the amplifier 210 is coupled to the display circuitry and meter 36 through a variable series resistor 222 which is under the control of the CAL. adjustment 60 on the faceplate 12 of the unit. When the ADVANCE-TACH switch 44 is in the TACH position, the signal from the integrating amplifier 210 is coupled to the display circuit and meter 36 where it is manifested as an indication of engine speed. It will be noted that the timing and tachometer integrating amplifier circuits 190 and 210, respectively, operate in a slightly different manner in that the timing circuit integrates a train of pulses, each of which is manually variable in duration in accordance with the strobe light delay adjustment controlled by the ADVANCE knob 68, whereas the tachometer integrating circuit and amplifier 210 integrate a train of pulses which are constant in width of duration in accordance with the RC time constant selected for the monostable multivibrator circuit 168.

Since the timing integrator circuit, including the amplifier 190, integrates a signal which varies both in pulse width and frequency, the system is self-compensating from a timing standpoint. That is, timing measurements will be accurate at any speed. For example, if engine speed is doubled from a thousand to two thousand r.p.m., the pulse width from the multivibrator 120 necessary to maintain proper alignment on the timing marks under observation of the light 32 must be cut in half by adjustment of the ADVANCE knob 68. However, reduction in the width of the timing pulses from the multivibrator circuit 120 is accompanied by a corresponding increase in the frequency of occurrence of those pulses due to the increase in engine speed. Hence the integrated value measured at the output of the amplifier 190 is the same for both speeds, provided, of course, that the actual advance of the ejection pump in degrees of engine crankshaft rotation remains the same.

In keeping with the present invention means are provided for selectively applying supply voltage to the timing-light trigger and voltage-multiplier circuits in accordance with the functional demands of the selected mode. To this end the circuitry of FIG. 2 includes a double-pole triple-throw switching device 230 operating under control of the TACH-OFF-T. LIGHT toggle switch 46 on the faceplate 12 (FIG. 1). For convenience of description the toggle switch is represented as a three-position dial in FIG. 2. When the switch 46 is in the timing-light. (T. LIGHT) position, power is supplied from the positive supply 14 both to the delay pulse multivibrator 120 and to the timing-light trigger circuits, including the amplifier 142 and the high-voltage converter 160. However, when the switch 46 is in the TACH position, power from the positive supply 14 is disconnected from the timing-light amplifier 142 and high-voltage converter 160, although power continues to be supplied to the remainder of the timing and tachometer circuits. In this way a needless waste of energy is avoided.

Briefly summarizing the operation of the system described thus far, assume that the TACH-ADVANCE switch 44 is in the TACH position and that the TACH-OFF-T. LIGHT switch 46 is also in the TACH position. Upon each surge of fuel to the number 1 cylinder through the fuel line thereto a signal is developed by the transducer 76 which is passed by the amplifier 108 to the trigger input of the monostable 120. Almost instantaneously the positive-going output 124 of the multivibrator 120 rises to trigger the second multivibrator circuit 168. Constant width pulses developed by the second multivibrator circuit 168 are integrated in the network consisting of resistor 214 and capacitor 216 operating in conjunction with the operational amplifier 210. The resultant d.c. level supplied to the display and meter circuit 36 is indicative of engine speed. The indicator light 38 on the faceplate 12 of the unit is illuminated by the signal emanating from the operational amplifier 210 to alert the operator that the readout on the display 36 is indicative of engine r.p.m. divided by 10.

After adjusting the speed, as indicated by the meter-display 36, in accordance with manufacturer's specifications, the operator moves the switch 44 to the ADVANCE position while at the same time moving the switch 46 to the T. LIGHT position. Power is now supplied to the strobe light circuits, as well as to the remainder of the circuit. Signals emanating from the transducer 76 as a result of fuel injection into the line are passed by input amplifier 108 to trigger the monostable multivibrator circuit 120 into operation. At the trailing edge of the output pulse from the multivibrator circuit 120 the timing-light triggering amplifier 142 and trigger circuit 154 are activated to illuminate the light 32 by discharge of the capacitor 162 therethrough. Successive pulses from the transducer 76 result in successive triggerings of the timing light 32 to create the strobe effect necessary for aligning the timing marks on the flywheel and its housing. Visual alignment is achieved through manual variation of the ADVANCE knob 68 which controls the time constant of the multivibrator circuit 120 and hence its output pulse width. Once an apparent coincidence between the timing marks on the engine is achieved through observation with the light 32, a meaningful reading of injection advance is available on the display 36.

At any time during the operation of the system the accuracy of the tachometer circuitry can be checked by simply moving the CAL. switch 64 on the faceplate 12 to its normally-open (NO) position. A highly stable signal from the crystal oscillator 82, as divided in frequency by the divider circuitry 84, will be fed through the system, and the operator can observe whether the reading on the display 36 is proper for the calibration frequency. If not, the calibration adjustment 60 can be unlocked by release of the locking nut 62 on the face panel of the unit, and the resistance of the series resistor 222 (FIG. 2) can be varied until the reading on the display 36 is in accordance with specifications for the unit.

Turning now to FIG. 3, there is shown an in-line transducer assembly 240 coupled between an injection fuel line 242 and a male outlet fitting 244 of a housing 246. The housing represented at 246 is, in one mode of operation, a part of the injector pump, such that the transducer assembly 240 detects pressure within the fuel line instantaneously upon injection into the line from the pump. In another mode of operation the housing 246 is a part of the injector nozzle assembly on the engine, in which case the transducer assembly 240 produces its output signal only when the surge of fuel pressure reaches the engine nozzle. As noted above, either mode of operation can be used with the present invention.

The transducer assembly 240 itself is comprised of a housing 248 having a male threaded protrusion 250 at one end for intermating with a conventional hold-down fitting 252 on the line 242 in a sealing manner. At the other end of the housing 248 is a female threaded cavity 254 adapted to intermate with the male protrusion 244 from the housing 246 in a sealing fashion. Interior to the housing 248 and coupling the aforesaid male and female portions is a cavity or conduit 256 for carrying fuel, without obstruction, through the housing 248. Intersecting the conduit 256 perpendicularly is a pair of conduits 258 and 260 which extend, respectively, to opposed threaded cavities 262 and 264.

For the purpose of generating an electrical signal in response to the increase of pressure within the line 242 and conduit 256, there is provided a cap-screw transducer 266 which is threaded into the cavity 264 in a sealing manner described below in connection with FIG. 3*a*. Oppositely disposed from the transducer 266 and threaded into the cavity 262 is a filler plug 268 which is sealed to the housing 248 through an O-ring 270. The cap-screw transducer 266 is interchangeable with the filler plug 268 and will operate equally effectively in either of the cavities 262 or 264. The provision of alternate receptacles for the transducer 266 allows the transducer 266 to be placed in its most convenient and accessible position after the housing 248 is tightened to the male projection 244.

The cap-screw transducer 266 is shown in detail in FIG. 3*a* and includes a hex-head portion 276 and a male threaded portion 278. An O-ring 280 is provided to effect a fluid-type seal between the transducer 266 and the assembly housing 248 so as to prevent the loss of fluid passing through the conduit 260 (FIG. 3). The outer shell of the transducer is made of a conductive metal to allow electrical current to pass therethrough. A cavity 282 is formed in the hex-head portion of the transducer in axial alignment with the threaded portion 278. The cavity 282 houses a piezoelectric slab 284 which conductively engages the metal of the transducer head 276 through a suitable conductive epoxy (not shown) along a lateral surface 286. The opposite surface 288 of the piezoelectric slab 284 is insulated from the transducer head 276 by provision of an epoxy filler 290. The signal generated by the piezoelectric slab 284 is transmitted to the associated circuitry (FIG. 2) via a metal conductor 292 which is soldered to the surface 288 of the piezoelectric slab 284 at a convenient point 294. The conductor 292 is the central core of a coaxial cable 296 which also includes an insulating portion 298 surrounding the conductor 292 and a conductive metal shield 300 which is grounded to the head 276 of the transducer 266 through a screw-in type coaxial fitting 302. When used as the transducer 76 in the circuit of FIG. 2, the signal developed on the conductor 292 constitutes the output 78 shown in FIG. 2.

In operation, the pressure of fluid within fuel-injection line 242 and conduit 260 creates a stress on the housing of the transducer 266 through the threaded portion 278. The sensitivity of the piezoelectric slab 284 is sufficient to detect this stress and generate a signal in the form of a voltage across its surfaces 286 and 288. This signal is fed to the circuitry of FIG. 2 over the coaxial cable 296. In lieu of the cap-screw transducer 266, shown in FIG. 3*a*, the cap-screw transducer shown in FIG. 7 of Yelke and Dooley U.S. Pat. No. 4,036,050 may also be used.

The in-line transducer assembly 240 shown in FIGS. 3 and 3*a* can be used to develop a fuel pressure-indicative signal anywhere along the fuel lines of the fuel-injection system where intermateable male and female fittings are found. Fittings of this type will typically be used at the nozzle end of the line, as well as at the pump, and the signal can be taken from either end of the line with equal effectiveness provided, of course, that the user takes into account the time delay that occurs as fluid travels through the line.

Certain engines and nozzle assemblies do not use interthreaded fuel-line fittings of the type shown in FIGS. 3 and 3*a*. For example, it is common with some makes of engines and nozzles to use banjo-type fittings for transferring fuel from the line to the nozzle assembly. Fittings of this type are in the shape of a thickened washer which is hollowed around its inner surfaces to allow fuel to flow therethrough to appropriate ports in a hold-down screw. In accordance with another aspect of the present invention, therefore, a modification of the cap screw concept shown in FIGS. 3 and 3*a* is provided which is specially adapted for use with banjo-type fittings of the type described. To this end, there is shown in FIG. 4 a cap-screw transducer 310 intermated with a banjo-type fitting 312. The shank or threaded portion 314 of the transducer 310 has a conduit 316 extending axially therethrough and one or more ports 318 which carry fuel to the conduit 316 from the circular cavity 320 formed within the banjo fitting 312. A fuel line 322 is coupled to the banjo fitting either directly or through an appropriate fitting (not shown). For detecting stress on the transducer resulting from the injection of fuel through the banjo fitting 312, the transducer 310 has a hex-shaped head 324 which is hollowed out to accept a coaxial fitting 326 and contains a piezoelectric slab mounted in a manner identical to that shown in FIG. 3*a* for the head 276 of the transducer 266. In operation, a surge of fuel through the line 322 creates a stress on the metal within the shank portion 314 of the transducer which is transmitted to the piezoelectric slab located within the head 324 of the transducer, creating an electrical signal representative of fuel pressure. This signal is fed to the circuitry shown in FIG. 2 in timing the engine as described above.

From the foregoing it will be apparent that there has been brought to the art an integrated diagnostic system for fuel injected engines which is particularly well adapted for deriving the necessary information concerning both engine timing and speed from a wide variety of fuel line pressure transducers with equal effectiveness. The diagnostic system herein described performs its multiple functions with maximum ease and minimum complexity. It is inexpensive to manufacture and easy to operate. The transducers disclosed make the diagnostic system readily adaptable to a wide variety of different engine types and injection system configurations.

I claim as my invention:

1. In an electronic diagnostic system for fuel injected engines of the type having a plurality of fuel injection lines running to the cylinders of the engine and wherein crankshaft timing marks are provided to indicate the top dead center position of the selected cylinder, the combination comprising:

transducer means coupled to the fuel injection line of said selected cylinder for detecting pressure variations within the line and producing an output signal which includes a primary output pulse representing the initiation of fuel injection into said line;

an input circuit adapted to pass said primary output pulse while being substantially non-responsive to all other portions of said transducer output signal, said input circuit including integrating means for producing a DC signal having a level which is proportional to the average value of said transducer output signal and a threshold detecting circuit coupled to said integrating means and said transducer means for passing said primary output pulse;

means actuated by said input circuit for generating a timing pulse having a selectively variable width;

strobe light means coupled to said timing pulse generating means for illuminating the timing marks on said engine at the completion of said timing pulse; and means responsive to the repetitive occurrence of said timing pulse for providing a manifestation of the relationship between fuel injection and the achievement of the top dead center position by said selected cylinder.

2. In an electronic diagnostic system for fuel injected engines of the type having a plurality of fuel injection lines each running to a respective cylinder of the engine and wherein crankshaft timing marks are provided to indicate the top dead center position of a selected cylinder, the combination according to claim 1 wherein said integrating means includes a divider circuit for establishing the level of said DC signal at a predetermined percentage of the transducer output signal.

3. In an electronic diagnostic system for fuel injected engines of the type having a plurality of fuel injection lines each running to a respective cylinder of the engine and wherein crankshaft timing marks are provided to indicate the top dead center position of a selected cylinder, the combination of claim 1 further including signal inhibiting means associated with said timing pulse generating means for preventing actuation of said timing pulse generating means for a predetermined time period subsequent to the initiation of each timing pulse.

4. In an electronic diagnostic system for fuel injected engines of the type having a plurality of fuel injection lines running to the cylinders ofthe engine, the combination comprising:

transducer means coupled to the fuel injection line of a selected cylinder for detecting pressure variations within the line and producing an output signal which includes a primary output pulse representing the initiation of fuel injection into said line;

an input circuit adapted to pass said primary output pulse while being substantially non-responsive to all other portions of said transducer output signal;

means actuated by said input circuit for generating a timing pulse in response to the occurrence of said primary output pulse; and signal inhibiting means including a monostable multivibrator associated with said timing pulse generator for producing a fixed duration output pulse in response to said timing pulse and means operative during said fixed duration output pulse for inhibiting said timing pulse generator so as to prevent the generation of additional timing pulses.

5. A tachometer system for fuel injected engines of the type having fuel lines for cyclically delivering fuel to the respective cylinders during each engine revolution, said system comprising in combination:

transducer means coupled to the fuel injection line of a selected cylinder for detecting pressure variations associated with said line and producing an output signal varying in accordance with said variations, said signal including primary pulses representing the initiation of fuel injection through said line during each engine revolution;

output circuit and display means responsive to the repetitively occurring primary pulses to produce an external manifestation of the frequency of occurrence of said primary pulses; and an input circuit coupled to said transducer means for receiving said transducer output signal and adapted to pass said primary pulses to said output circuit and display means while being non-responsive to all variations of said transducer output signal other than said primary pulses, said input circuit including integrating means for producing a DC signal having a level which is proportional to the average value of said transducer output signal and a threshold-detecting circuit coupled to said integrating means and said transducer means for producing an output whenever the transducer output signal exceeds the level of said DC signal of said integrating means.

6. A tachometer system according to claim 5 wherein said integrating means includes a divider circuit for establishing the level of said DC signal at a predetermined percentage of the transducer input signal.

7. A pressure transducer assembly for a fuel line in a fuel injected engine, comprising in combination a transducer housing having fittings for sealingly mounting said housing in axial engagement with said fuel line, said housing having a) a first conduit extending therethrough for passage of fluid through said housing, b) a threaded receptacle extending generally transverse to said first conduit and opening to the exterior of said housing, and c) a second conduit extending from said threaded receptacle to said first conduit to allow fluid flow therebetween, said combination further including a screw-in unit having a shank portion threaded into said receptacle, said shank portion having a substantially flat forward pressure face extending across said threaded receptacle, said screw-in unit further having a broadened head portion adapted to be compressed against said housing as said shank portion is threaded into said receptacle, said head portion having a cavity formed therein and a piezoelectric slab element disposed within said cavity in close proximity to the plane in which said head portion presses against said housing so that changes in the fluid pressure from said second conduit acting against said pressure face stress said head portion to create an electrical signal across said piezoelectric slab element.

8. A transducer assembly according to claim 7 wherein said second conduit of said housing extends perpendicular to said first conduit, wherein said housing further includes a second threaded receptacle and a filler plug adapted for intermating with either of said receptacles and wherein said screw-in unit is intermatable with either of said threaded receptacles.

9. In a diagnostic system for fuel-injected engines of the type wherein fuel is delivered to the cylinder through a conduit which is terminated at one of its ends in a circular banjo-type fitting having fuel-carrying recesses about its periphery, a transducer assembly associated with said banjo-type fitting and including a bolt-like element having a) a shank section extending through said banjo-type fitting and having a hollowed passage therethrough for carrying fuel delivered through said fitting and b) an expanded head section for securing said fitting in sealing engagement with said shank section by compressing said fitting across its periphery, said head section having a piezoelectric pick-up device fixedly mounted therein in close proximity to the interface between said head section and said fitting for producing an output signal in response to variations in the fuel pressure acting upon said shank section.

10. A transducer assembly for fuel injected engines of the type wherein fuel is conveyed to a cylinder through a conduit which is terminated at one of its ends in a circular banjo-type line fitting having fuel-carrying passages located therein, said assembly comprising a bolt-like transducer housing having a hollowed shank portion for transferring fuel from said fuel-carrying passages of said line fitting and an expanded head portion coupled to said shank portion and extending in overlapping relation over said banjo-type fitting when said shank portion axially intersects said banjo fitting, said head portion serving to compress said banjo-type fitting in completing the fuel path from the fitting to the hollowed shank portion, and a piezoelectric slab coupled to said head portion in a plane parallel to and in close proximity to the interface between said head portion and said banjo-type fitting.

11. A transducer assembly according to claim 10 wherein said head portion of the transducer housing has a cylindrical well formed therein which extends coaxially toward said shank portion, said well having a disc shaped piezoelectric element bonded to its inner end with conductive adhesive to develop an electrical signal in response to changes in stress upon said head portion from said shank portion.

* * * * *